UNITED STATES PATENT OFFICE.

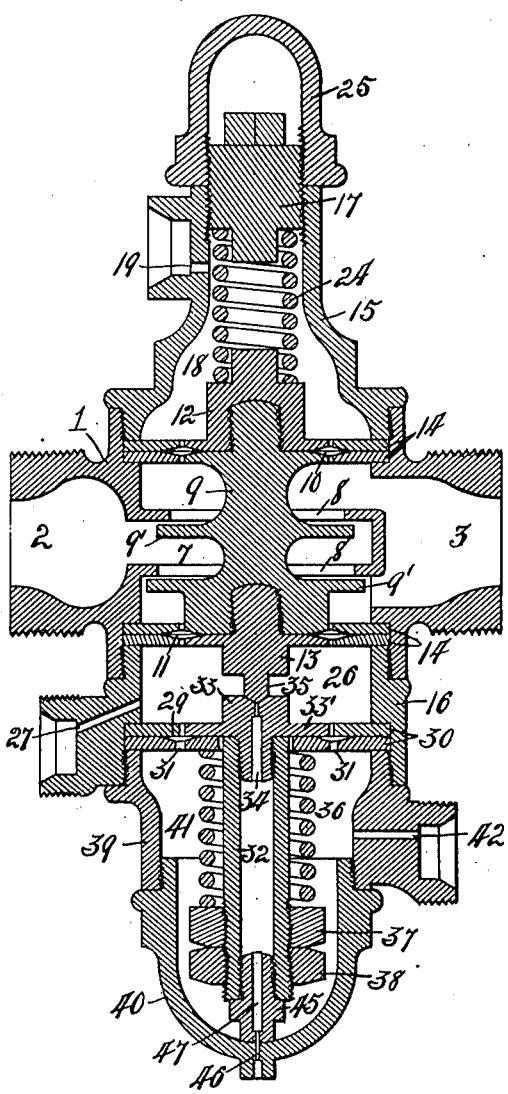

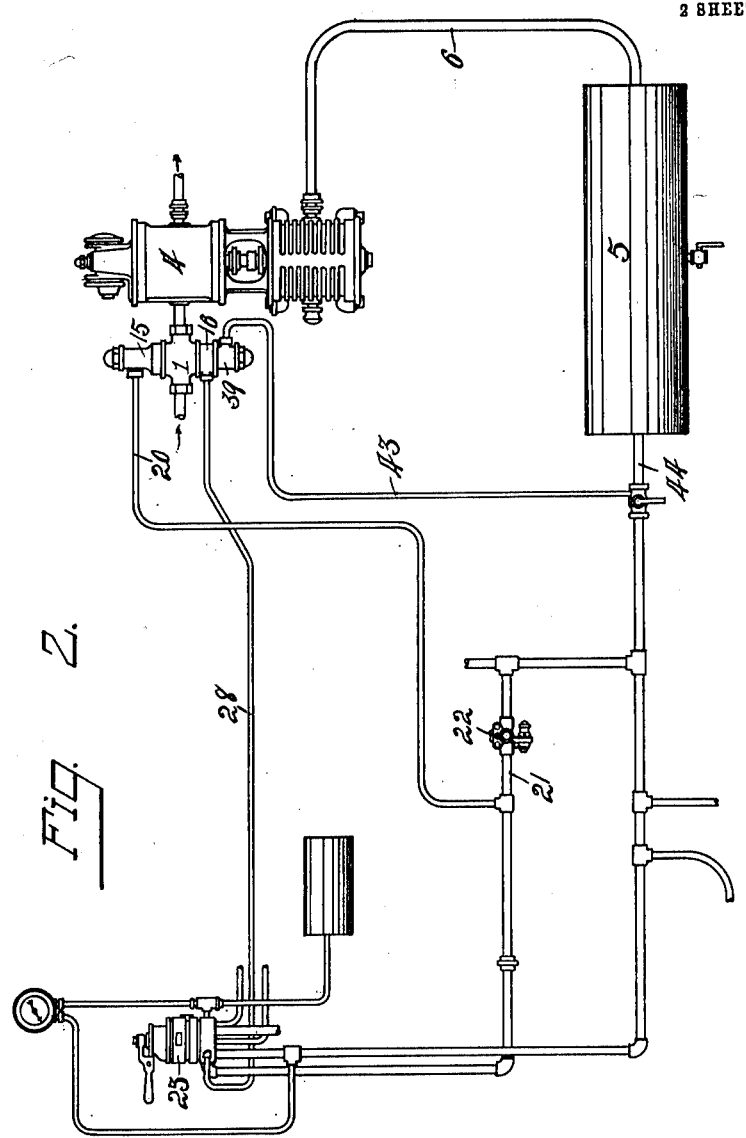

DANIEL W. RIDINGER, OF DEFIANCE, OHIO, ASSIGNOR OF ONE-HALF TO GEORGE W. BUSSERT, OF DELPHOS, OHIO.

AIR-PUMP GOVERNOR.

991,647. Specification of Letters Patent. Patented May 9, 1911.

Application filed November 3, 1910. Serial No. 590,538.

*To all whom it may concern:*

Be it known that I, DANIEL W. RIDINGER, a citizen of the United States, and a resident of Defiance, in the county of Defiance and State of Ohio, have invented a certain new and useful Air-Pump Governor; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to governors for use on air pumps or the like, and is particularly intended for use in connection with the air-brake apparatus of trains, electric cars, or the like, but is not restricted to such use as it may be used in any connection for which it may be adapted or appropriate. The function of governors of this class, when connected with the air brake equipment of trains, is to sufficiently restrict the speed of the compressor or pump, when the desired main reservoir pressure is obtained, to prevent such pressure from rising any higher. During most of the time on a trip the automatic brake-valve is in "running" position, keeping the brakes charged. But little excess pressure is then needed and the governor regulates the main reservoir pressure to about twenty pounds above the brake pipe pressure, thus making the work of the compressor easier. On the other hand, when the brakes are applied a high main reservoir pressure is needed to insure their prompt release and recharge. Therefore, as soon as the use of "lap", "service" or "emergency" positions is commenced the governor allows the compressor to work freely until the maximum reservoir pressure is obtained. Again, when the brake pipe pressure is changed from one amount to another by the feed valve, as where a locomotive is used alternately in high brake and ordinary service, the governor acts to automatically change the main reservoir pressure to suit, and at the same time maintains the other features above described. Another important feature of the governor is that its connections to the brake valve permit the engineer to raise and maintain the brake pipe pressure about twenty pounds above the feed valve regulation before commencing and during the descent of steep grades, merely by the use of "release" position of the automatic brake valve, the position which should be used during such braking.

The object of my invention is the provision of a governor of this class, which is simple and efficient in its construction and adapted to take the place of the usual double governor, is composed of a minimum number of parts to get out of order or become broken, is devoid of the usual pistons which frequently leak and become sticky, contains no valves which may leak and stop the pump, and has no holes to become stopped up and cause bad results. It also maintains the high pressure constant above the feed valve pressure, and prevents a sudden stopping of the pump.

The invention is fully described in the following specification and while in its broader aspect, it is capable of embodiment in numerous forms, a preferred embodiment thereof is illustrated in the accompanying drawings, in which,—

Figure 1 is a central longitudinal section of my governor, and Fig. 2 is a diagrammatical view of the same and the parts of an air-brake equipment with which it is connected.

Referring to the drawings, 1 designates the main valve casing, which is open at its top and bottom and has the steam inlet 2 at one side for connection with the locomotive boiler or other source of steam supply, and has the steam outlet 3 at its opposite side in connection with a steam pump 4, which pump operates to pump air into the main reservoir 5 of an air-brake equipment through a connecting pipe 6.

The inlet 2 opens into a chamber 7 within the casing 1 and passes from such chamber to the outlet passage 3 of such casing through the openings 8, 8 in the upper and lower walls of said chamber, as shown. A double valve 9 works through the openings 8 of the chamber 7 and has two flanges 9', 9', which are spaced to simultaneously seat, in the present instance, against the lower marginal walls of said openings or to uncover such openings upon an opening movement of the valve. The valve 9 is held normally unseated to a slight extent, as shown, by upper and lower diaphragms 10 and 11 exerting an equal pressure thereon. These diaphragms are held to the ends of the valve by the nuts or members 12 and 13, which are respectively threaded to the upper and lower ends of the valve. The outer edges of the diaphragm are held between sets of rings 14, which are shown, in the present instance, as being clamped to the respective open ends of the casing 1 by the coöperating action of the casing parts 15 and 16, which are threaded thereto.

The casing part or shell 15 coöperates with a plug 17, threaded in the upper end thereof, to form a low-pressure air chamber 18 above the valve 9 and diaphragm 10, and has an inlet opening 19 in the side thereof for connection through the usual pipe 20 with the train line 21 intermediate the feed valve 22 and the automatic brake valve 23, so as to admit feed valve pressure to the chamber 18. A coiled expansion spring 24 is disposed within the chamber 18 and has its opposite ends thrust against the nut 12 and plug 17 to exert a downwardly or unseating pressure of say twenty pounds, upon the valve 9. The tension of this spring is adjusted by turning the plug 17 within the casing part 15.

25 designates a cap which is threaded over the outer end of the plug 17 and serves to lock it in adjusted position.

The casing part or shell 16 forms a low-pressure chamber 26 below the valve 9 and diaphragm 11, and this chamber has communication through a side inlet port 27 and connecting pipe 28 with the automatic brake valve 23 so that the pressure in such chamber is equal to the automatic brake-valve pressure. The bottom of the chamber 26 is closed by a diaphragm 29, which is held at its outer edge between a set of clamping rings 30, the lower of which is larger than the upper and perforated as at 31. The inner edge of the diaphragm 29 is gripped between the upper end of a hollow stem or tube 32, which projects down through the opening of the lower ring 30, and the flange 33' of a plug 33, which plug is bored, as at 34, to provide a drainage passage from the chamber 26 to the stem or tube 32. The plug 33 has a valve seat at its upper end against which a valve 35 on the lower end of the nut or member 13 seats to normally close the passage 34 in said plug. A coiled expansion spring 36 encircles the stem 32 and has its upper end thrust against the lower ring 30 and has its lower end thrust against an adjusting nut 37, which is threaded to the lower end of said stem and held in adjusted position thereon by a lock-nut 38. This spring preferably has a tension of from twenty to thirty pounds and exerts a downward pressure upon the stem 24 and attached parts, as is apparent.

The rings 30 are held to their seat in the lower portion of the casing part 16 by a casing part or shell 39, which is shown as being threaded therein and as coöperating with an end casing part 40 to form a high-pressure air chamber 41 below the diaphragm 29. The high-pressure chamber 41 has communication through a port or passage 42 and connecting pipe 43 with the main reservoir 5 or the pipe 44 leading therefrom, so that the main reservoir pressure and that of the high-pressure chamber 41 are equal.

The lower end of the stem 32 carries a plug 45, which, when the stem is lowered in normal position seats around a small leakage passage 46 in the end casing part 40 of the chamber 41 to close communication between such passage and said chamber. The plug 45 has a passage 47 therethrough in register with the casing passage 46, to permit the escape of air from the low-pressure chamber 26 to the atmosphere through the plug 33, stem 32, plug 45 and passage 46, when the valve is unseated to uncover the passage 34 in the plug 33.

In operation, my improved governor has feed-valve or train line pressure in the low-pressure chamber 18 and automatic brake-valve pressure chamber in the low pressure chamber 26. Steam enters at inlet 2 and passes by steam valve 9, when unseated, and to the compressor 4. When the automatic brake valve handle is in "release", "running", or "holding" positions, the main reservoir 5 is open to low pressure chamber 26 through the automatic brake valve, thus permitting the pump 4 to run until the main reservoir pressure is equal to the feed valve or train line pressure in low pressure chamber 18 and the added pressure exerted upon the valve 9 by the spring 24. When the pressure in the low pressure chamber 26 which is always the same as the main reservoir pressure when the brake valve is in "release" "running" or "holding" position, slightly exceeds feed valve pressure in the chamber 18 and the additional pressure exerted by the spring 24, which spring exerts an opening pressure of substantially twenty pounds on the valve 9, the diaphragm 11 and valve 9 will be lifted to seat the latter and effect a closing of the steam passage 8, 8 to stop or slow down the pump 4. The lifting of the valve 9 unseats the attached valve 35 to permit a leakage of air to the atmosphere from the chamber 26 through the port 34, stem 32, plug 45 and passage 46, to prevent a complete stopping of the pump. When the main reservoir pressure in the chamber 26 becomes reduced, the combined spring and air pressure above the diaphragm 10 forces it down and unseats the steam-valve 9. When the automatic brake-handle is in "lap", "service" or "emergency" positions, the low pressure chamber 26 is cut off from the main reservoir. The pump will then run until the main reservoir pressure in high pressure chamber 41 exceeds the feed valve pressure in low pressure chamber 18 and the combined pressures of the springs 24 and 36 when the diaphragms and valve 9 will rise and slow down the compressor. This raising of the valve 9 requires an excess of pressure of from 40 to 50 pounds within the main reservoir 5 and high pressure chamber 41 over the feed valve pressure in the low pressure chamber 18, which excess pressure is utilized to release and recharge the brakes. A complete stopping of the pump is prevented in this instance, however, due to the leakage which occurs from the high pressure chamber 41 to the atmosphere through the port 46 when the valve 45 is raised or unseated. The adjustment of the springs 24 and 36 fixes the maximum limit of main reservoir pressure during the time the automatic brake valve handle is in "lap", "service", or "emergency" positions.

I wish it understood that my invention is not limited to any specific construction or arrangement of the parts except in so far as such limitations are specified in the claims.

Having thus described my invention, what I claim as new and desire to secure by Letters Patent, is,—

1. In an air pump governor, two fluid pressure chambers, an intermediate valve chamber for the passage of a pump actuating fluid, diaphragms separating the valve chamber from the pressure chambers, a valve in said valve chamber and normally held open by said diaphragms, yielding means coöperating with the diaphragms to hold the valve open, the valve seating when the pressure in one pressure chamber exceeds the pressure in the other pressure chamber and that of said means, and means automatically operative to permit a drainage from one of said chambers when the valve is moved in one direction.

2. In an air pump governor, a steam passage to an air-pump, fluid pressure chambers at opposite sides of said passage, diaphragms separating said passage and chambers, a valve having a double seat within said passage to close the same and attached to said diaphragms, means coöperating with the pressure in one chamber and said diaphragms to normally hold the valve in open position against the pressure in the other chamber, and a drainage valve for one of such chambers, said valve being opened by a movement of the passage valve in one direction.

3. In an air pump governor, a casing having a passage therethrough for a pump operating fluid and forming fluid pressure chambers at opposite sides of said passage each of which chambers has communication with a source of fluid under pressure, diaphragms separating the passage from said chambers, a valve carried by said diaphragms within said passage, a spring mounted in one of said chambers and coöperating with the fluid pressure in such chamber and the diaphragms to normally hold the valve in open position, the valve being closed by excess pressure in one of said chambers over the pressure acting on the valve to influence its opening movements.

4. In an air pump governor, a passage for a pump operating fluid, a valve for closing said passage, at least three fluid pressure chambers associated with such passage, yielding means normally holding the valve open, said means requiring one pressure to close the valve when fluid is admitted to one of said chambers and another pressure to close the valve when fluid is admitted to another of said chambers.

5. In an air pump governor, a casing having a passage for a pump operating fluid and forming low-pressure chambers on opposite sides of said passage and a high-pressure chamber, said chambers having communication with sources of fluid pressure, a valve for closing said passage, means coöperating with the pressure in one of said low-pressure chambers to maintain the valve open until the fluid pressure in one of said low-pressure chambers exceeds said valve opening pressures, means coöperating with said valve opening pressure to require a greater pressure within the high-pressure chamber to close the valve than the closing pressure required in one of said low-pressure chambers.

6. In an air pump governor, a passage for a pump operating fluid, a valve for closing such passage, low pressure chambers associated with said passage and having communication with sources of fluid pressure, diaphragms separating said chambers from the passage and normally influencing an opening of the valve, means coöperating with the fluid pressure in one of said chambers to resist a closing of the valve by pressure in the other of said chambers, a high pressure chamber having communication with a source of fluid pressure, and means coöperating with said first mentioned means and the coöperating fluid pressure to resist a closing of the valve, by fluid pressure in the high pressure chamber until the pressure in such chamber has been raised to a predetermined point.

7. In an air pump governor, a passage for a pump operating fluid, a valve for closing such passage, low pressure chambers disposed on opposite sides of said passage and having communication with sources of fluid pressure, diaphragms separting such chambers from said passage and movable with the valve, a high pressure chamber at the outer side of a low pressure chamber and having communication with a source of fluid pressure, a diaphragm separating said contiguous high and low pressure chambers, said latter diaphragm having a drainage port therethrough, a valve movable with said first valve to close said port when the operative parts are in normal position and to open said port when said passage valve is closed by pressure in one of said low pressure chambers, means coöperating with the fluid pressure in one of the fluid pressure chambers to resist a closing of the valve by fluid pressure in the other of said chambers, and means coöperating with said first mentioned means for resisting a closing of the valve fluid pressure within the high pressure chamber until such fluid pressure has reached a predetermined point.

8. In an air pump governor, a casing forming a passage for a pump operating fluid, two low pressure chambers and a high pressure chamber, said chambers having communication with sources of fluid under pressure, a valve for closing said passage and having a drainage valve movable therewith, means in one of said low pressure chambers for coöperating with the fluid pressure therein for resisting a seating of said passage valve by fluid pressure in the other of said low pressure chambers, means in the high pressure chamber for coöperating with said valve opening means to resist an opening of the valve by pressure in the high pressure chamber until such pressure has reached a predetermined point, and means coöperating with said drainage valve for permitting a drainage of fluid from one of said low pressure chambers when the valve is moved to close said passage.

9. In an air pump governor, a casing forming a passage for a pump operating fluid, two low-pressure chambers and a high-pressure chamber having a drainage port, said chambers having communication with sources of fluid under pressure, a valve mounted in said passage for closing the same, a drainage valve movable with said passage closing valve, diaphragms separating said chambers and said passage, means coöperating with the pressure in one of said low-pressure chambers to resist a seating of said passage valve by fluid pressure in the other of said low-pressure chambers, means in the high-pressure chamber for coöperating with said valve opening, means to resist an opening of the valve by pressure in the high-pressure chamber, means normally closed by said drainage valve for permitting a drainage of fluid from one of said low-pressure chambers and normally closed by said drainage valve, said drainage means being also operative to normally close the drainage port from said high-pressure chamber and movable to open such port when the passage valve is closed by pressure in the high-pressure chamber.

10. In an air pump governor, a casing forming a passage for a pump operating fluid and chambers 18, 26 and 41 which have communication with sources of fluid under pressure, the chamber 41 having a drainage port, diaphragms separating said chambers and passage, a valve 9 for closing said passage and normally standing open, a valve 35 movable with the valve 9, a channeled part movable with the diaphragm separating the chambers 26 and 41, said part normally closing communication between the chamber 41 and its drainage port and having its channel normally closed by the valve 35, yielding means within the chamber 18 for coöperating with the fluid pressure therein to resist a closing of the valve 9 and an opening of the valve 35 by fluid pressure within the chamber 26, and yielding means coöperating with the pressure in the chamber 18 and said first mentioned yielding means to resist a closing of the valve 9 by fluid pressure in the chamber 41, said channeled part moving to open the passage between the chamber 41 and the atmosphere when the valve 9 is moved by pressure within the chamber 41.

11. In an air pump governor, a passage for a pump operating fluid, a valve for closing said passage, at least three fluid pressure chambers associated with such passage yielding means normally holding the valve open, said means requiring one pressure to close the valve by fluid admitted to one of said chambers and another pressure to close the valve by fluid admitted to another of said chambers, and a leakage valve associated with each of said latter chambers to open the respective chambers to the atmosphere when the passage valve is closed by pressure in such chambers.

12. In an air pump governor, a casing having a passage for a pump operating fluid and forming low pressure chambers on opposite sides of said passage and a high pressure chamber, said chambers having communication with sources of fluid pressure, a valve for closing said passage, means coöperating with the pressure in one of said low pressure chambers to maintain the valve open until the fluid pressure in the other of said low pressure chambers exceeds said valve opening pressure to require a greater pressure within the high pressure chamber to close the valve than the closing pressure required in one of said low pressure chambers, and a leakage valve associated with each of said chambers to which fluid pressure is admitted to close the valve, said leakage valves automatically opening to the respective chambers to the atmosphere when the valve is closed by pressure therein.

13. In a fluid chamber governor, a passage for a pump operating fluid, a valve for closing said passage, a fluid pressure chamber associated with said passage and having a drainage port, yielding means normally holding the valve open, said valve being moved to close the passage by fluid pressure in said chamber, and a part movable by a closing movement of the valve to effect an opening of said port.

14. In a fluid pump governor, a passage for a pump operating fluid, a valve for said passage, fluid pressure chambers associated with said passage, yielding means normally holding said valve open, said valve being moved to close the passage when the fluid pressure in one chamber exceeds both the pressure in the other chamber and the opening pressure of said means on the valve, and means automatically operative to permit a drainage from one of said chambers when the valve has closing movements.

15. In a fluid pump governor, a passage for a pump operating fluid, a valve for closing said passage, high and low pressure fluid chambers disposed on opposite sides of said passage and separated therefrom, yielding means coöperating with fluid pressure in the low pressure chamber to normally hold the valve open, said valve being moved to close the passage when the fluid pressure in the high pressure chamber exceeds both the pressure in the other chamber and the opening pressure of said means on the valve, and a drainage valve for the high pressure chamber, said valve being opened by a closing movement of the passage valve.

In testimony whereof, I have hereunto signed my name to this specification in the presence of two subscribing witnesses.

DANIEL W. RIDINGER.

Witnesses:
JOHN W. WINN,
HARRIET BLAIR.